United States Patent
Tahara et al.

(10) Patent No.: US 6,349,115 B1
(45) Date of Patent: Feb. 19, 2002

(54) DIGITAL SIGNAL ENCODING APPARATUS, DIGITAL SIGNAL DECODING APPARATUS, DIGITAL SIGNAL TRANSMITTING APPARATUS AND ITS METHOD

(75) Inventors: Katsumi Tahara; Hideki Koyanagi, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/258,428

(22) Filed: Feb. 26, 1999

(30) Foreign Application Priority Data

Mar. 2, 1998 (JP) ............................................. 10-049495

(51) Int. Cl.[7] ................................................. H04B 1/66
(52) U.S. Cl. ............. 375/240.26; 348/718; 375/240.25; 725/94
(58) Field of Search ........................ 375/240.26, 240.25; 345/547, 531, 536, 555; 348/714, 715, 716, 718; 725/94, 115; 710/52; 711/100

(56) References Cited

U.S. PATENT DOCUMENTS

| | | | | |
|---|---|---|---|---|
| 5,068,650 A | * | 11/1991 | Fernandez et al. ........... 345/547 |
| 5,583,562 A | * | 12/1996 | Birch et al. ............ 375/240.25 |
| 5,604,682 A | * | 2/1997 | McLaughlin et al. ........ 725/115 |
| 5,610,841 A | * | 3/1997 | Tanaka et al. ............... 725/115 |
| 5,623,311 A | * | 4/1997 | Phillips et al. ......... 375/240.25 |
| 5,640,210 A | * | 6/1997 | Knee et al. ................. 348/469 |
| 5,646,959 A | * | 7/1997 | Kamishima ................. 375/240 |
| 5,652,916 A | * | 7/1997 | Murakami et al. ............ 710/52 |
| 5,680,175 A | * | 10/1997 | Yanai et al. ................. 348/441 |
| 5,689,313 A | * | 11/1997 | Sotheran ...................... 710/52 |
| 5,691,777 A | * | 11/1997 | Kassatly ................ 375/240.18 |
| 5,701,582 A | * | 12/1997 | DeBey ........................ 725/103 |
| 5,764,893 A | * | 6/1998 | Okamoto et al. .............. 725/94 |
| 5,787,472 A | * | 7/1998 | Dan et al. ...................... 725/94 |
| 5,809,239 A | * | 9/1998 | Dan et al. ...................... 725/94 |
| 5,815,502 A | * | 9/1998 | Saito et al. .................. 370/545 |
| 5,828,788 A | * | 10/1998 | Chiang et al. .............. 382/239 |
| 5,838,394 A | * | 11/1998 | Kajimoto et al. ........ 375/240.12 |
| 5,874,995 A | * | 2/1999 | Naimpally et al. ..... 375/240.25 |
| 5,880,786 A | * | 3/1999 | Oku et al. .............. 375/240.15 |
| 5,917,538 A | * | 6/1999 | Asamizuya ................... 725/94 |
| 5,995,707 A | * | 11/1999 | Lee .............................. 386/81 |
| 6,069,662 A | * | 5/2000 | Horiuchi et al. ............. 348/715 |
| 6,075,900 A | * | 6/2000 | Sakazawa et al. ...... 375/240.11 |
| 6,084,910 A | * | 7/2000 | Stanger et al. ......... 375/240.03 |
| 6,091,776 A | * | 7/2000 | Linzer .................... 375/240.12 |
| 6,125,147 A | * | 9/2000 | Florencio et al. ....... 375/240.26 |
| 6,151,074 A | * | 11/2000 | Werner ........................ 345/555 |
| 6,181,824 B1 | * | 1/2001 | Takizawa et al. ............ 382/233 |
| 6,226,038 B1 | * | 5/2001 | Frink et al. .................. 348/443 |
| 6,229,850 B1 | * | 5/2001 | Linzer et al. ........... 375/240.11 |
| 6,249,550 B1 | * | 6/2001 | Mizuno et al. ......... 375/240.24 |

* cited by examiner

Primary Examiner—Howard Britton
(74) Attorney, Agent, or Firm—Frommer Lawrence & Haug LLP; William S. Frommer (57) ABSTRACT

In the speckled broadcasting of HDTV and SDTV, an encoding transmitting apparatus and a decoding receiving apparatus can perform a parallel multichannel transmission and reception of SDTV with a simple construction. When an HDTV video signal is encoded and decoded, each of the transmission buffer 30 and the reception buffer 80 is used as a single buffer. On the other hand, when a plurality of SDTV video signals are encoded and decoded, the transmission buffer 30 and the reception buffer 80 are divided into the number of SDTV video signals to use them as a plurality of divided transmission buffers and a plurality of divided reception buffers, so as to perform a encoding and decoding processing.

10 Claims, 11 Drawing Sheets

DIGITAL SIGNAL ENCODING APPARATUS, DIGITAL SIGNAL DECODING APPARATUS, DIGITAL SIGNAL TRANSMITTING APPARATUS AND ITS METHOD

BACKGROUND OF THE INVENTION

1. Field of the Invention

The present invention relates to a digital signal encoding apparatus, a digital signal decoding apparatus, a digital signal transmitting apparatus and its method, and more specifically, is applicable to a digital satellite broadcasting.

2. Description of the Related Art

Figure 1:
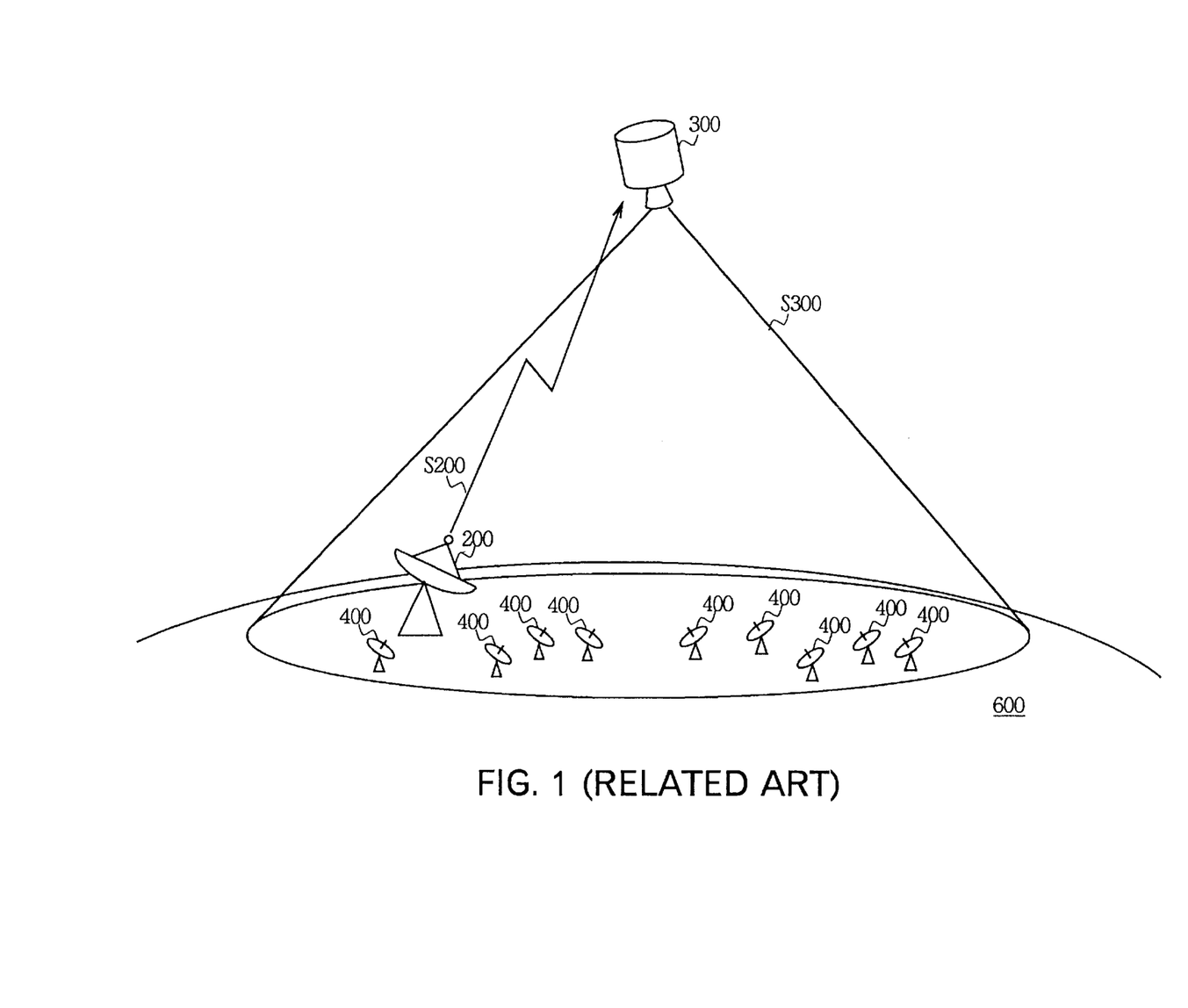
FIG. 1 is a schematic diagram showing the digital satellite broadcasting system.

A digital satellite broadcasting system using stationary satellite has been started to be used. In FIG. 1, numeral 600 denotes a digital satellite broadcasting system as a whole. A transmission signal S200 transmitted from a transmission antenna 200 is received and amplified by a satellite 300 to be output as a transmission signal S300. The transmission signal S300 is received by a reception antennas 400. Thereby, a broadcasting system having a wide service area which has little reception interference due to obstacles on the ground can be realized. The digital satellite broadcasting system uses an image compressive encoding method called moving picture experts groups (MPEG2) to multiplex a plurality of channels on one transport stream and transmit it.

Figure 2:
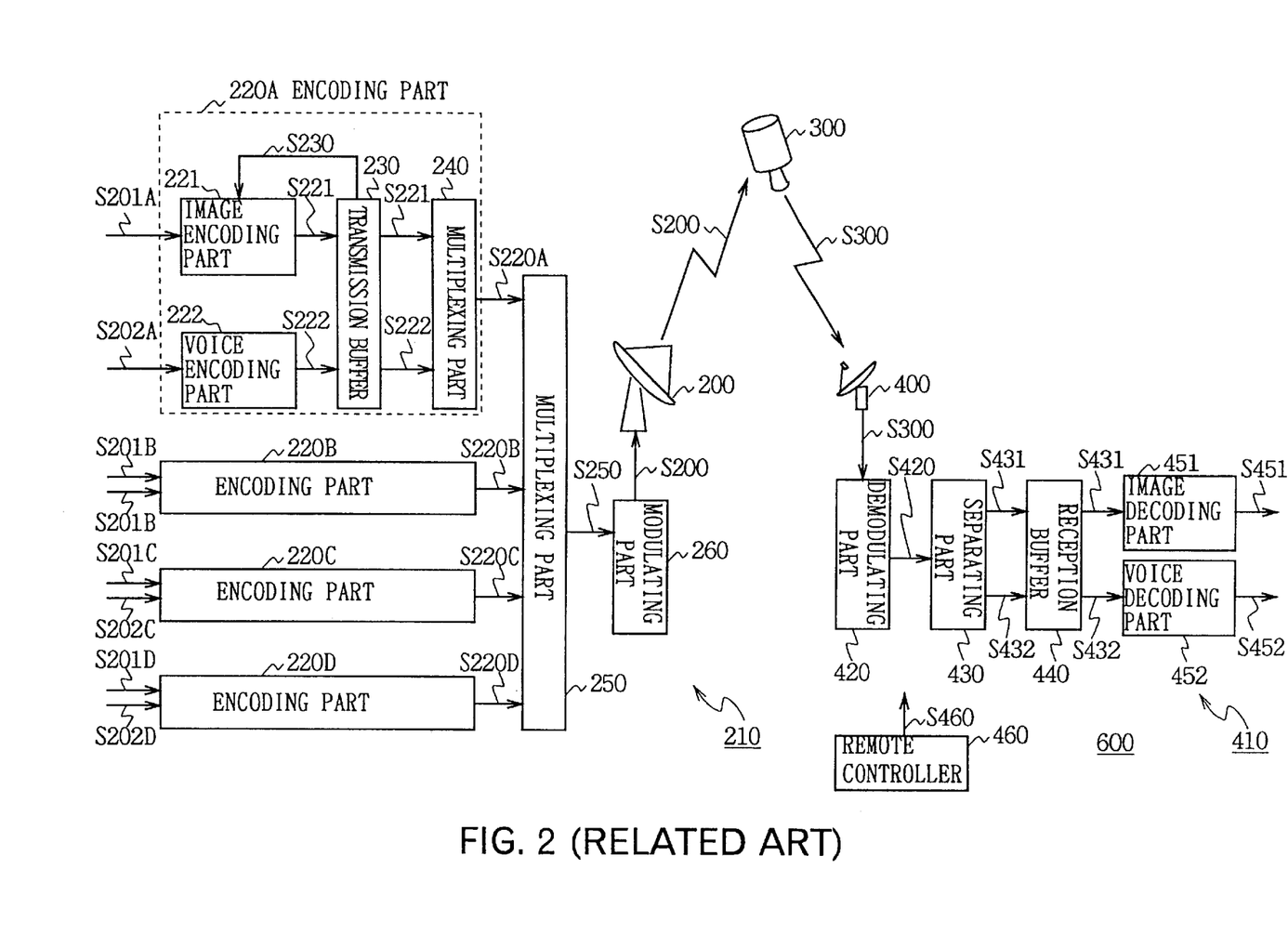
FIG. 2 is a block diagram showing the digital satellite broadcasting system.

In the digital satellite broadcasting system 600 shown in FIG. 2, video signals S201A to S201D and audio signals S202A to S202D are supplied from the exterior to an encoding transmitting apparatus 210. In the encoding transmitting apparatus 210, four encoding parts 220A to 220D which have the same construction are connected to a multiplexing part 250, and the video signals S201A to S201D and the audio signals S202A to S202D are input to corresponding encoding parts 220A to 220D.

A video encoding part 221 and an audio encoding part 222 included in the encoding part 220A respectively encode the video signal S201A and the audio signal S202A by using the MPEG2 method, and they are output to a transmission buffer 230 as video encoded data S221 and audio encoded data S222 respectively. The transmission buffer 230 temporarily stores the video encoded data S221 and the audio encoded data S222, and then reads out them at a predetermined timing to output them to a multiplexing part 240. The video encoding part 221 constantly checks the content by the amount of the video encoded data S221 in the transmission buffer 230 as content information S230, and controls the amount of codes to be generated of the video encoded data S221 based on the content information S230.

The multiplexing part 240 multiplexes the video encoded data S221 and the audio encoded data S222 and outputs the resultant to a multiplexing part 250 as multiplexed data S220A. The multiplexing part 250 multiplexes the multiplexed data S220A and the multiplexed data S220B to S220D respectively output from the encoding parts 220B to 220D, and outputs the resultant to a modulating part 260 as a transport stream S250. The modulating part 260 performs a predetermined modulation on the transport stream S250 and transmits the resultant via the transmission antenna 200 as a transmission signal S200.

The satellite 300 receives and amplifies the transmission signal S200, and transmits the resultant as a transmission signal S300. In a decoding receiving apparatus 410, the transmission signal S300 is received by the reception antenna 400 to be demodulated at a demodulating part 420, and is output to a separating part 430 as a transport stream S240. The separating part 430 selects one of the video encoded data and one of the audio encoded data among from the encoded data multiplexed on the transport stream S420 in accordance with selection signal S460 output from a remote controller 460, and outputs these data to a reception buffer 440 as video encoded data S431 and audio encoded data S432.

The video encoded data S431 and the audio encoded data S432 are temporarily stored in the reception buffer 440 and then they are read out at a predetermined timing to be decoded by a video decoding part 451 and an audio decoding part 452. Thereafter, they are output to a television receiver (not shown) as a video signal S451 and an audio signal S452.

Here, in the MPEG2 method, the amount of codes to be generated by an encoding processing changes depending on the pattern of each picture of image to be encoded. In short, when the pattern is complicated, the amount of codes to be generated increases, and when the pattern in simple, the amount of codes to be generated decreases. However, the transmission signals S200 and S300 are transmitted at a fixed rate, so that the transmission buffer 230 and the reception buffer 440 are provided to absorb the fluctuation of the rate.

Figure 3:
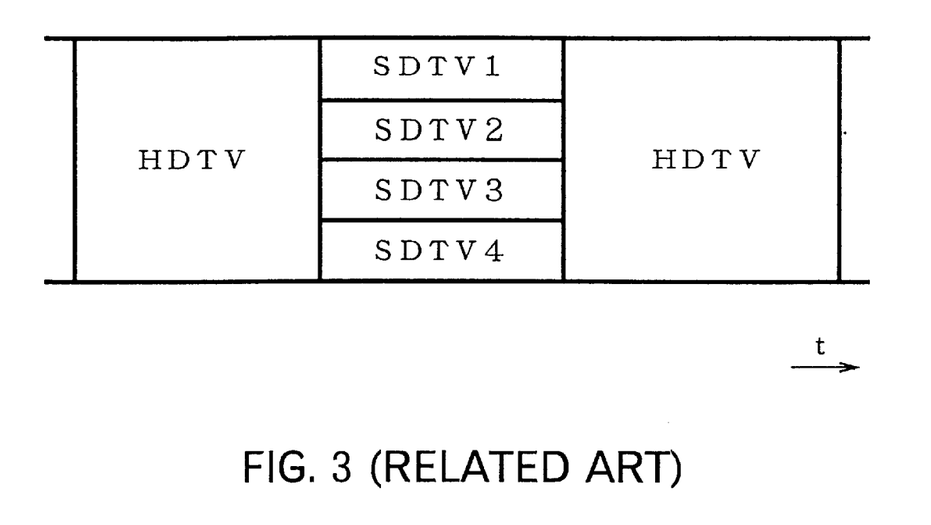
FIG. 3 is a schematic diagram showing the speckled broadcasting.

In the digital satellite broadcasting system, so-called speckled broadcasting for broadcasting alternately a plurality of standard definition television (SDTV) channels and one high definition television (HDTV) channel in one transponder has been studied. FIG. 3 shows an example of the speckled broadcasting. In one transponder, one channel of HDTV is broadcasted in one time slot, and four channels of SDTV are broadcasted in another time slot. In this way, the SDTV and the HDTV are broadcasted changeably, so that a broadcasting using the definition depending on the program contents can be performed.

Figure 4:
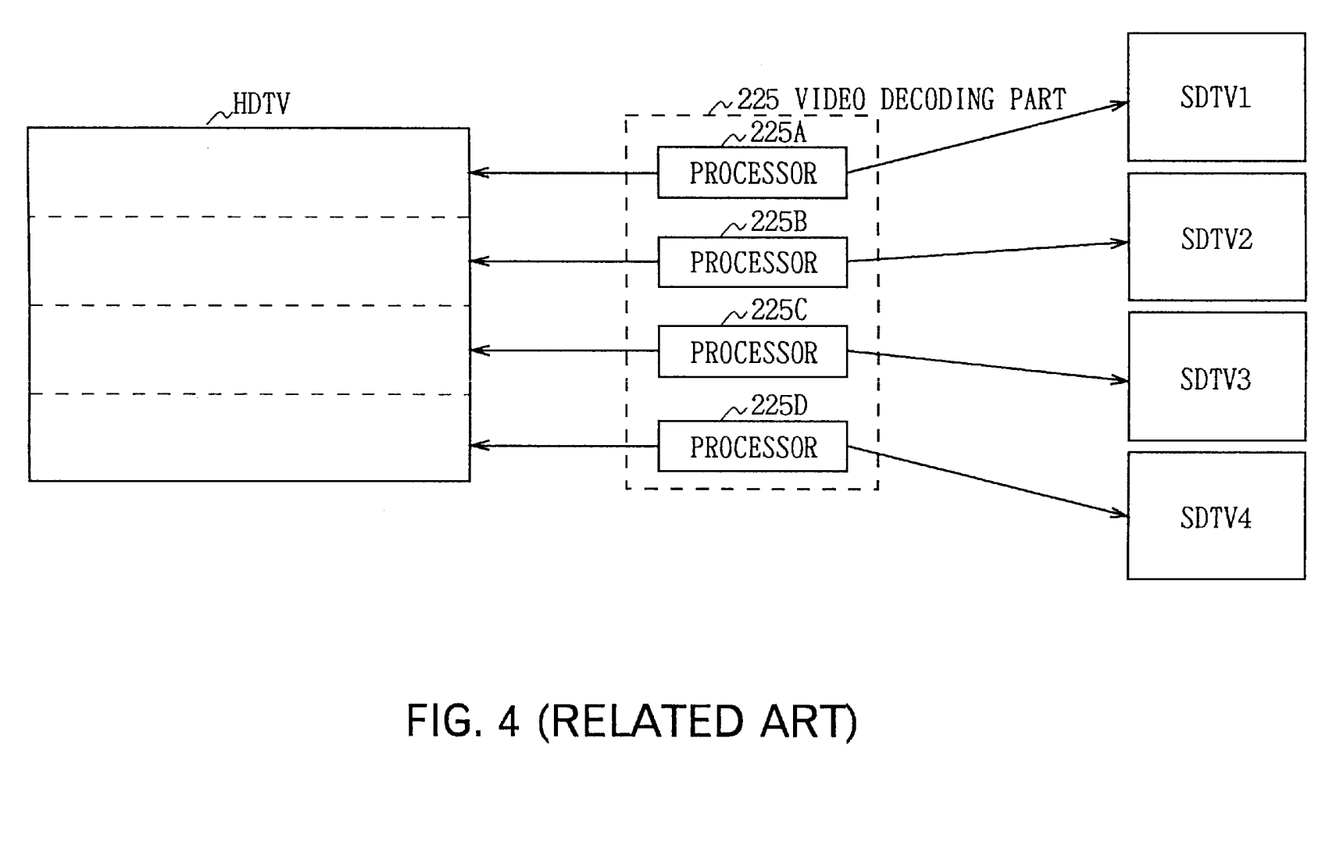
FIG. 4 is a schematic diagram showing the division processing of the decoding part.

The video encoding and video decoding of the HDTV are performed by a plurality of processors for SDTV which are combined. FIG. 4 shows the decoding processing of HDTV image in a video decoding part 225 for HDTV. The HDTV screen area is divided into four areas to be parallel-processed by four decoding processors 225A to 225D so as to perform the decoding processing of HDTV which has larger data size than that of SDTV.

The video decoding part 225 consists of four decoding processors 225A to 225D for SDTV, so that it has an ability to decode four channels of SDTV at the same time. Thereby, as shown in FIG. 4, a parallel multichannel reception for decoding a plurality of SDTV at the same time by using the video decoding part 225 can be considered.

Figure 5:
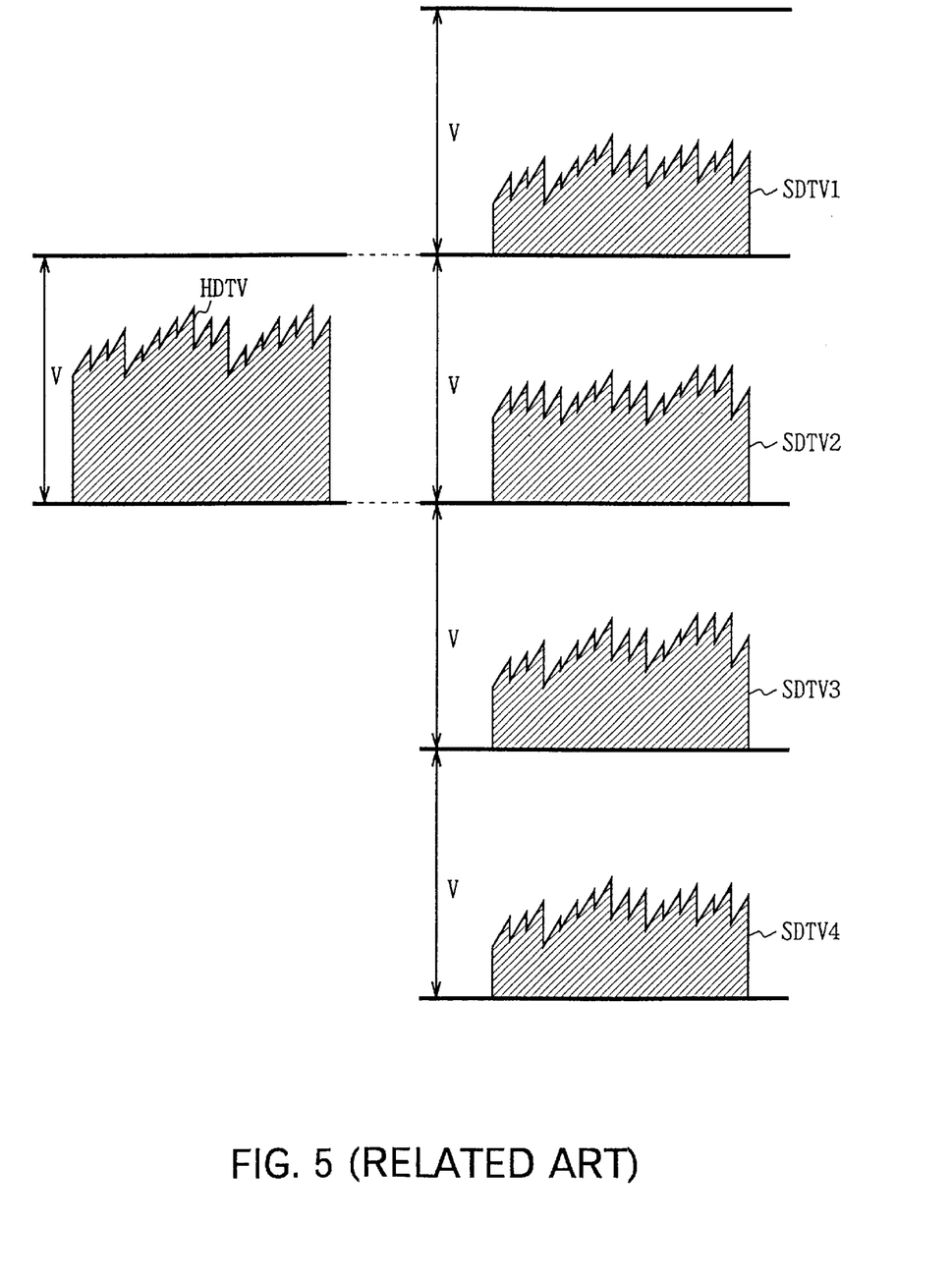
FIG. 5 is a schematic diagram showing the use conditions of reception buffer in the speckled broadcasting.

However, to perform the parallel multichannel reception in a receiving apparatus, the number of buffers equal to the number of channels of SDTV to be displayed is required. More specifically, as shown in FIG. 5, four reception buffers are required to perform the parallel multichannel reception for decoding four channels of SDTV at the same time. Thus, this case has a problem that the construction becomes complicated and the price raises.

SUMMARY OF THE INVENTION

In view of the foregoing, and object of this invention is to provide a digital signal encoding apparatus, digital signal decoding apparatus, digital signal transmitting apparatus and its method which can perform the parallel multichannel reception of SDTV with a simple construction.

The foregoing object and other objects of the invention have been achieved by the provision of a digital signal encoding apparatus, digital signal decoding apparatus, digital signal transmitting apparatus and its method, in which a transmission buffer and a reception buffer are each used as a single buffer when the first video signal is encoded and decoded. When the number N of second video signals which have the picture elements less than that of the first video signal are encoded and decoded, the transmission buffer and the reception buffer are divided into the number of the second video signals to use them as a plurality of divided transmission buffers and a plurality of divided reception buffers.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 6:
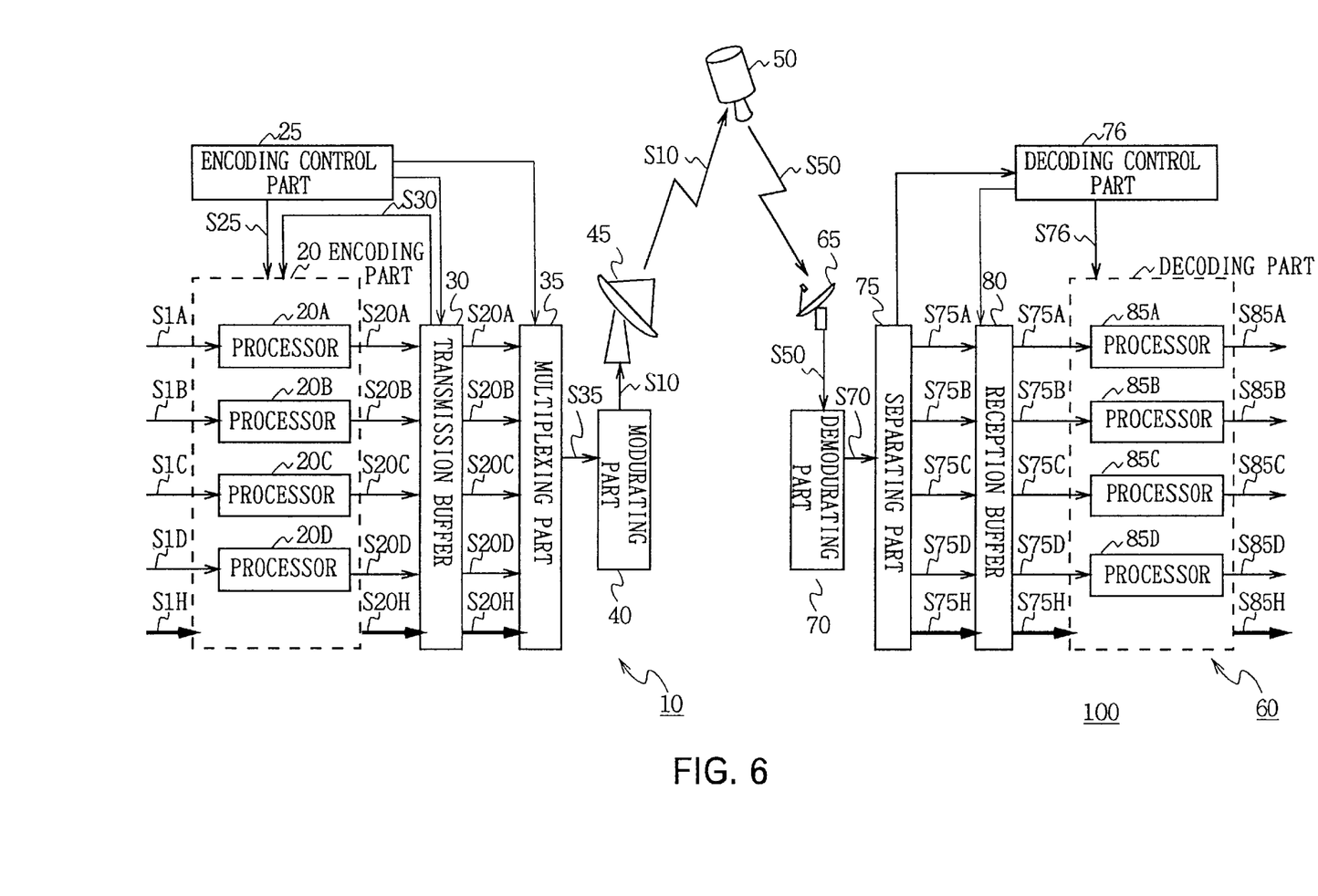
FIG. 6 is a block diagram showing a digital satellite broadcasting system according to the present invention.

Preferred embodiments of this invention will be described with reference to the accompanying drawings:

In FIG. 6 symbol 100 denotes a digital satellite broadcasting system as a whole. One channel of HDTV video signal S1H or N channels (here N=4) of SDTV video signals S1A to S1D are supplied alternately from the exterior to an encoding part 20 of an encoding transmitting apparatus 10 in accordance with the broadcasting time slot.

An encoding control part 25 constantly checks the format of the supplied video signal, and outputs a format signal S25 to the encoding part 20 in accordance with the format. The encoding part 20 encodes the HDTV video signal S1H or the SDTV video signals S1A to S1D by the MPEG2 method in accordance with the format signal S25.

Figure 7:
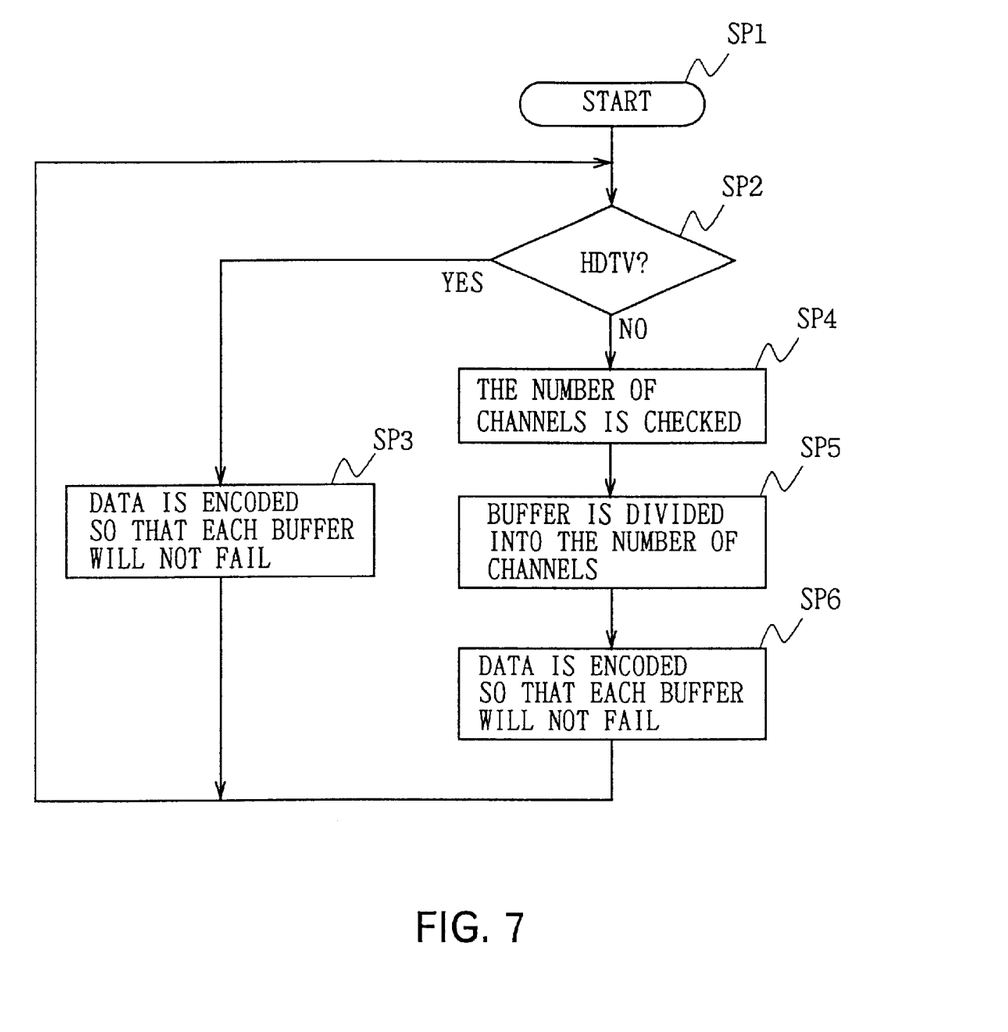
FIG. 7 is a flowchart showing the encoding processing in the speckled broadcasting according to the present invention.

More specifically, FIG. 7 shows the encoding processing in the encoding transmitting apparatus 10. The processing starts at step SP1, and at step SP2, the format of the video signal is judged based on the format signal S25 (FIG. 6). An affirmative result at step SP2 signifies that the format of the video signal is HDTV, and the processing proceeds to step SP3.

At step SP3, the encoding part 20 parallel-processes and encodes the HDTV video signal S1H by using four encoding processors 20A to 20D constituting the encoding part 20, and outputs the resultant to a transmission buffer 30 as encoded HDTV data S20H to temporarily store it. The encoding part 20 constantly checks the content by amount of the encoded HDTV data S20H in the transmission buffer 30 as content information S30, and controls the amount of codes to be generated of the encoded HDTV data S20H based on the content information S30.

Figure 8:
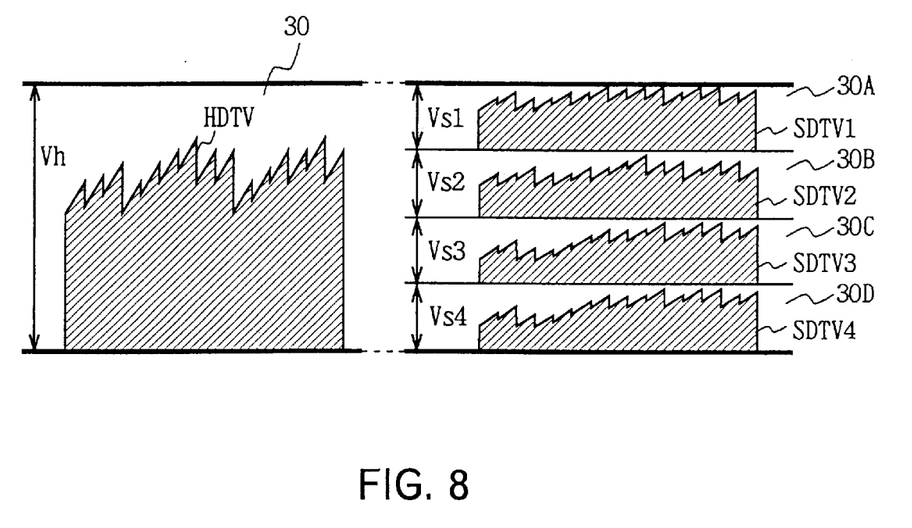
FIG. 8 is a schematic diagram showing the use condition of buffer in the speckled broadcasting according to the present invention.

At this time, the encoding part 20 uses the whole capacity of the transmission buffer 30 to control the amount of codes to be generated of the encoded HDTV data S20H so that the transmission buffer 30 will not fail. That is, as shown in FIG. 8, the all capacity Vh of the transmission buffer 30 is used to encode the HDTV video signal S1H.

While, a negative result at step SP2 signifies that the format of the video signal is SDTV, and the processing proceeds to step SP4.

At step SP4, the encoding part 20 confirms the number of channels of the SDTV video signal to be multiplied. More specifically, the encoding part 20 confirms the number of the SDTV video signals supplied to the encoding part 20 to set this number as the number n (here, N=4) of multiplexed channels. Then, at step SP5, the capacity Vh of the transmission buffer 30 is divided into N. That is, FIG. 8 shows the case where the number N of the multiplied channels is four, and the capacity Vh of the transmission buffer 30 is divided into four. They are respectively controlled as independently divided transmission buffers 30A to 30D each having the divided buffer capacities Vs1 to Vs4. The buffers are unnecessary to have the same size, and for example, the divided buffer capacity may be large for channels requiring the high picture quality, and may be small for channels not requiring the high picture quality.

Then, at step SP6, the encoding part 20 encodes the SDTV video signals S1A to S1D respectively by using the corresponding encoding processors 20A to 20D, and outputs them to the corresponding divided transmission buffers 30A to 30D as encoded SDTV data S20A to S20D. At this time, the encoding part 20 constantly checks the content by amount of each encoded SDTV data S20A to S20D in the divided transmission buffers 30A to 30D as content information S30 to control the amount of codes to be generated of the encoded SDTV data S20A to S20D based on the content information S30. As shown in FIG. 8, the encoding part 20 controls the amount of codes to be generated of the encoded SDTV data S20A to S20D based on the divided buffer capacities Vs1 to Vs4 so that the divided transmission buffers 30A to 30D will not fail.

Figure 9:
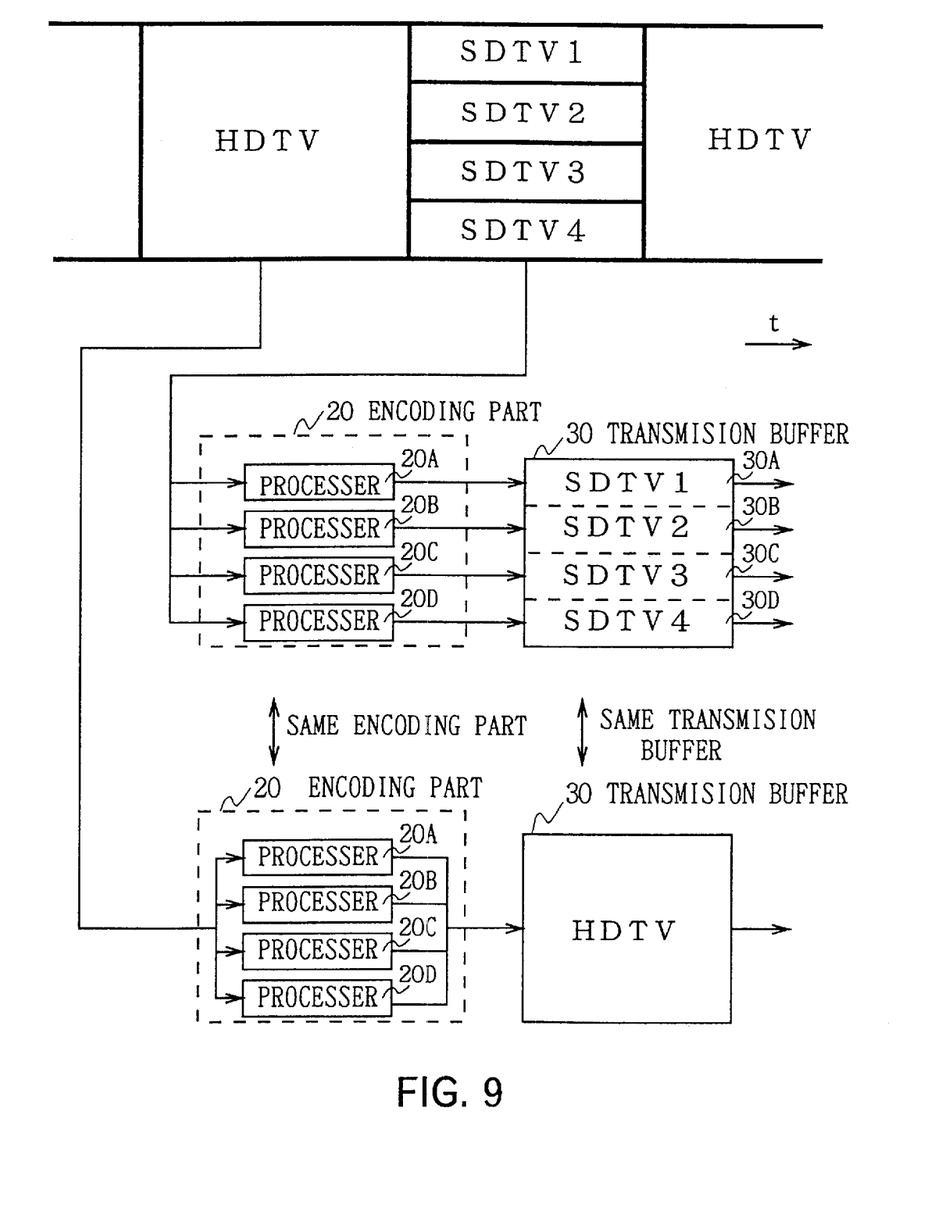
FIG. 9 is a schematic diagram showing the encoding processing in the speckled broadcasting according to the present invention.

In this way, the encoding transmitting apparatus 10 performs the encoding processing in accordance with the format of supplied video signal. More specifically, as shown in FIG. 9, when the HDTV video signal is supplied, the encoding processors 20A to 20D constituting the encoding part 20 parallel-processes and encodes the HDTV video signal, and the transmission buffer 30 is used as a single buffer. On the contrary to this, when the SDTV video signal is supplied, each of the encoding processors 20A to 20D, which constitute the encoding part 20, encodes the corresponding SDTV video signal, and the transmission buffer 30 is used as the divided transmission buffer 30A to 30D.

In FIG. 6, the transmission buffer 30 successively reads out the encoded HDTV data S20H or the encoded SDTV data S20A to S20D at a fixed rate, and outputs the resultant to a multiplexing part 35. The multiplexing part 35 multiplexes the encoded HDTV data S20H or the encoded SDTV data S20A to S20D by the MPEG2 method, and outputs the resultant to a modulating part 40 as a transport stream S35. At this time, the multiplexing part 35 records the format of the video signal and the number N of multichannel in a table called program specific information (PSI) in the transport stream S35, and at the same time, records the buffer capacity Vh or Vs1 to Vs4 used for encoding in a table called sequence header in the transport stream S35. The modulating part 40 performs a predetermined modulation processing on the transport stream S35 to transmit it as a transmission signal S10 via a transmission antenna 45.

A satellite 50 receives and then amplifies the transmission signal S10 to transmit it as a transmission signal S50. In a decoding receiving apparatus 60, the transmission signal S50 is supplied to a demodulating part 70 via a reception antenna 65. The demodulating part 70 demodulates the transmission signal S50 and outputs it to a separating part 75 as a transport stream S70.

The separating part 75 performs the separating processing on the transport stream S70 by the MPEG2 method. That is, the separating part 75 generates the encoded HDTV data S75H or the encoded SDTV data S75A to S75D from the transport stream S70 to output the resultant to a reception buffer 80.

A decoding control part 76 refers the PSI and the sequence header of the transport stream S70 to obtain the image format of the encoded data, the number of multichannel, and the buffer capacity Vh, or Vs1 to Vs4 used for encoding which are multiplexed on the transport stream S70, and outputs the format signal S76 corresponding to these to a decoding part 85. The decoding part 85 performs a processing in accordance with the format signal S76.

Figure 10:
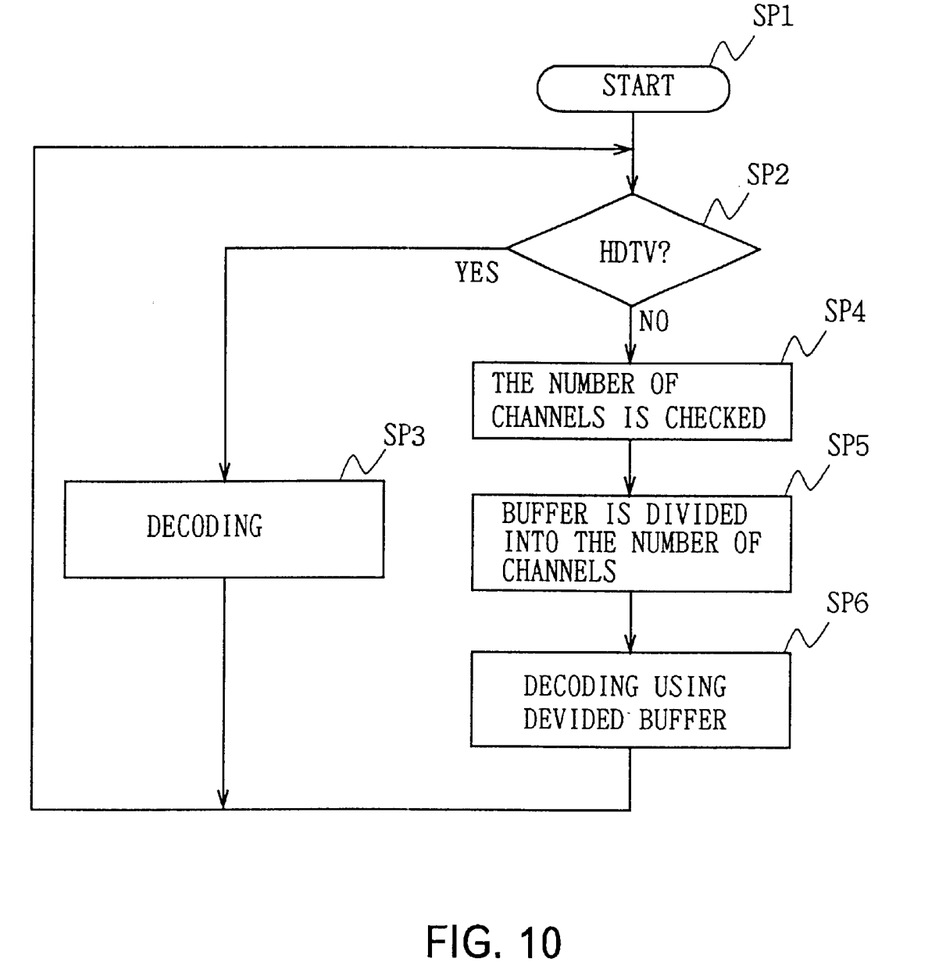
FIG. 10 is a flowchart showing the decoding processing in the speckled broadcasting according to the present invention.

More specifically, FIG. 10 shows the decoding processing in the decoding receiving apparatus 60. The processing starts step SP11, and at step SP12, the format of the video signal is judged based on the format signal S76 (FIG. 6). If an affirmative result at step SP12 signifies that the format of the video signal is HDTV, and the processing proceeds to step SP13.

At step SP13, as shown in FIG. 8, the decoding receiving apparatus 60 uses all of the buffer capacity Vh of the reception buffer 80 to perform buffering. More specifically, the reception buffer 80 once takes-in the encoded HDTV data S75H supplied from the separating part 75, thereafter, successively reads out it at a predetermined timing to output it to the decoding part 85.

The decoding part 85 parallel-processes and decodes the encoded HDTV data S75H by using four decoding processors 85A to 85D constituting the decoding part 85, and outputs it to a television receiver (not shown) as an HDTV video signal S85H.

On the other hand, a negative result at step SP12 signifies that the format of the video signal is SDTV, and in this case, the processing proceeds to step SP14.

At step SP14, the decoding receiving part 60 confirms the number of channels of the SDTV video signal multiplexed on the transport stream S70. More specifically, the decoding part 60 obtains the number N of multiplexed channels from the format signal S76 (FIG. 6). Then, at step SP15, the reception buffer 80 is controlled as virtually and independently divided reception buffers 80A to 80D having the respective divided buffer capacities Vs1 to Vs4 shown in FIG. 8.

At step SP16, the decoding receiving part 60 performs the decoding processing by using the divided reception buffers 80A to 80D. More specifically, the divided reception buffers 80A to 80D once take-in the encoded SDTV data S75A to S75D respectively, which are supplied from the separating part 75, and thereafter, successively read out them at a predetermined timing to output them to the decoding part 85 respectively.

The decoding part 85 decodes the SDTV video signals S1A to S1D by using corresponding decoding processors 85A to 85D, and outputs them to a television receiver (not shown) as SDTV video signals S85A to S85D respectively.

Figure 11:
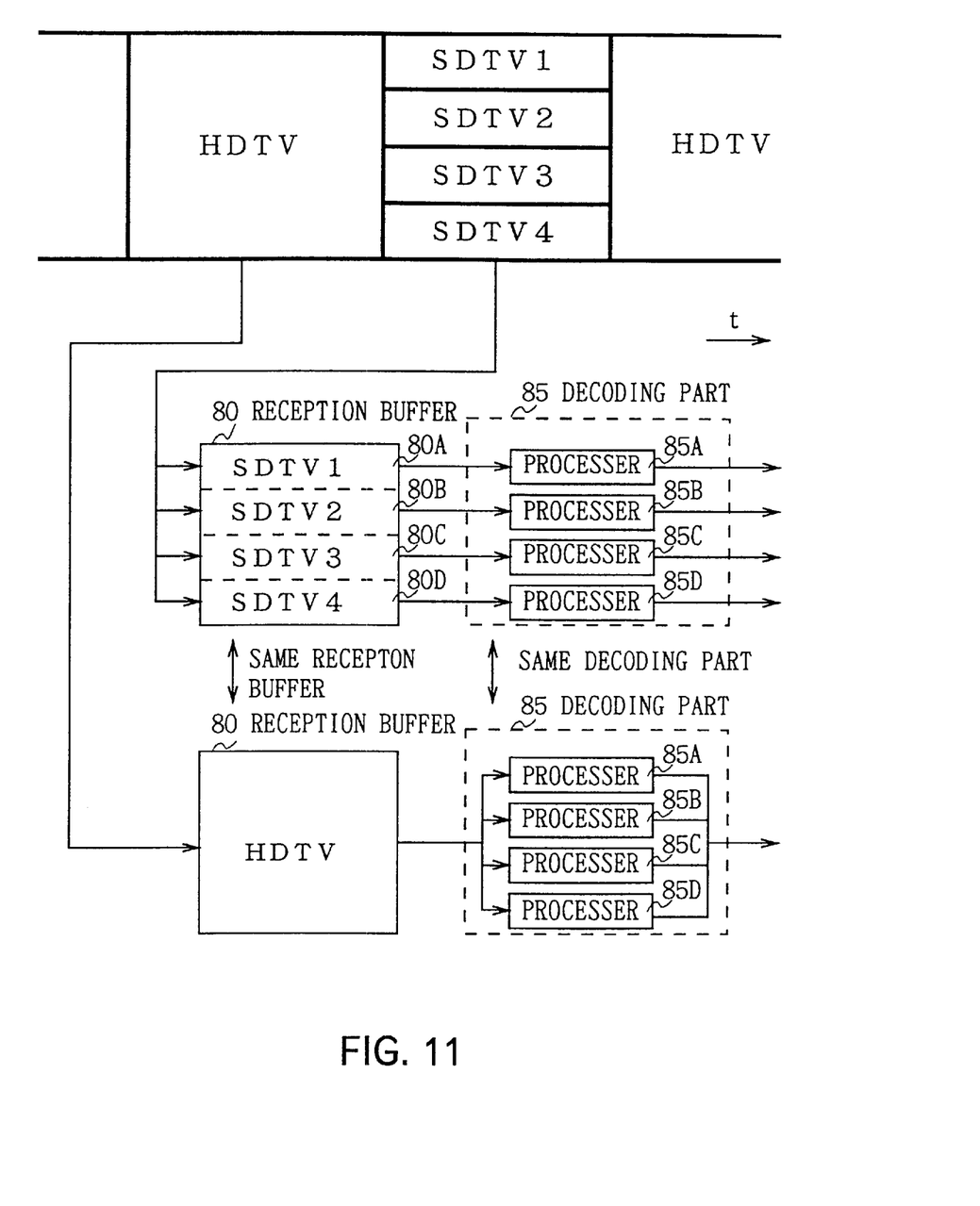
FIG. 11 is a schematic diagram showing the decoding processing in the speckled broadcasting according to the present invention.

In this way, the decoding receiving apparatus 60 performs the decoding processing in accordance with the format of supplied video signal. That is, as shown in FIG. 11, when the HDTV video signal is supplied, the reception buffer 80 is used as a single buffer, and the decoding processors 85A to 85D constituting the decoding part 85 parallel-process and decode the HDTV video signal. On the contrary, when the SDTV video signal is supplied, the reception buffer 80 is used as the divided reception buffers 80A to 80D, and each of the decoding processors 85A to 85D, which constitute the decoding part 85, decodes the corresponding SDTV video signal.

In the above construction, when the HDTV video signal S1H is supplied to the encoding transmitting apparatus 10, the encoding part 20 parallel-processes and encodes the HDTV video signal S1H by using four encoding processors 20A to 20D constituting the encoding part 20, and outputs it to the transmission buffer 30 as encoded HDTV data S20H. At this time, the transmission buffer 30 is used as a single buffer.

The encoded HDTV data S20H is temporarily stored in the transmission buffer 30 and then read out at a predetermined fixed rate successively to be transmitted as a transmission signal S10 through the multiplexing part 35, the modulating part 40, and the transmission antenna 45. The transmission signal S10 is received and amplified by the satellite 50 and transmitted as a transmission signal S50.

In the decoding receiving apparatus 60, the transmission signal S50 is received by the reception antenna 65 and output as encoded HDTV data S75H through the demodulating part 70 and the separating part 75. At this time, the reception buffer 80 is used as a single buffer, the same as the transmission buffer 30. The encoded HDTV data S75H is temporarily stored in the reception buffer 80 and then read out a predetermined timing successively. Then, the encoded HDTV data S75H is a parallel-processed and decoded by the decoding processors 80A to 80D to be output as an HDTV video signal S85H.

On the contrary, when four SDTV video signals S1A to S1D are supplied to the encoding transmitting apparatus 10, the encoding part 20 encodes the SDTV video signals S1A to S1D by using four encoding processors 20A to 20D respectively, and outputs them as encoded SDTV data S20A to S20D respectively. At this time, the transmission buffer 30 is divided into four to be used as divided transmission buffers 30A to 30D respectively. The encoded SDTV data S20A to S20D are output to be divided transmission buffer 30A to 30D respectively.

The encoded SDTV data S20A to S20D are temporarily stored in the corresponding divided transmission buffers 30A to 30D and then successively read out a predetermined fixed rate to be transmitted as a transmission signal S10 through the multiplexing part 35, the modulating part 40, and the transmission antenna 45. The transmission signal S10 is received and amplified by the satellite 50, and transmitted as a transmission signal S50.

In the decoding receiving apparatus 60, the transmission signal S50 is received by the reception antenna 65 and output as SDTV data S75A to S75D through the demodulating part 70 and the separating part 75. At this time, the reception buffer 80 is divided into four, the same as the transmission buffer 30, to be used as independently divided reception buffers 80A to 80D respectively. The encoded SDTV data S75A to S75D are output to corresponding divided reception buffers 80A to 80D, and then temporarily stored therein and read out at a predetermined timing successively. Then, the encoded SDTV data S75A to S75D are decoded by the corresponding decoding processors 85A to 85D in the decoding part 85 and output as SDTV video signals S85A to S85D to a television receiver (not shown).

According to the above structure, in the encoding transmitting apparatus 10 and the decoding receiving apparatus 60, when HDTV video signal is encoded and decoded, each of the transmission buffer 30 and the reception buffer 80 is used as a single buffer. On the other hand, when a plurality of SDTV video signals are encoded and decoded, the transmission buffer 30 and the reception buffer 80 are respectively divided into the number of the SDTV video signals to use them as a plurality of divided transmission buffers and a plurality of divided reception buffers. Therefore, a parallel multichannel transmission of SDTV and a parallel multichannel reception of SDTV can be performed without increasing of the number of reception buffers and transmission buffers.

Note that, in the above described embodiment, the number of encoding processors constituting the encoding part 20 and the number of decoding processors constituting the decoding part 80 are set to be four. However, the present invention is not limited to this, but the other number of the encoding processors and the decoding processors can be provided.

Further, in the above described embodiment, one HDTV and a plurality of SDTV are alternately broadcasted in the speckled broadcasting. However, the present invention is not limited to this, but various combination, such as one HDTV and a plurality of extended definition television (EDTV), and a plurality of EDTV and a plurality of SDTV, can be also used for the speckled broadcasting.

Furthermore, in the above described embodiment, one HDTV video signal and a plurality of SDTV video signals are encoded by the same encoding part. However, the present invention is not limited to this, but one encoding part for HDTV and a plurality of encoding parts for SDTV are provided so as to encode the HDTV video signal and SDTV video signals respectively. This case also has an advantage that the construction becomes simple by using the transmission buffer in common.

As described above, according to this invention, each of a transmission buffer and a reception buffer is used as a single buffer when the first video signal is encoded and decoded. On the other hand, when the number N of second video signals which each has the picture elements less than that of the first video signal are encoded and decoded, the transmission buffer and the reception buffer are divided into the number of second video signal to use them as a plurality of divided transmission buffers and a plurality of divided reception buffers, so as to perform a parallel multichannel transmission and reception without increasing the number of reception buffer and transmission buffer.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A digital signal encoding apparatus for encoding a first video signal or the number N (N is a natural number) of second video signals of which the number of picture elements is less than that of the first video signal, which is supplied from the exterior, comprising:

control means for judging whether a video signal supplied from the exterior is said first video signal or said number N of second video signals;

encoding means for encoding said first video signal or said N second video signals to output the result as first encoded data or the number N of second encoded data; and a buffer for temporarily storing said first encoded data or said number N of second encoded data and outputting it, and wherein said control means divides said buffer into N areas when it is judged that said video signal supplied from the exterior is said number N of second video signals, and controls said encoding means so as to encode in parallel said number N of second video signals with said buffer divided into N areas.

2. A digital signal decoding apparatus for decoding first encoded data which is obtained by encoding a first video signal or the number N of second encoded data which are obtained by encoding the number N (N is a natural number) of second video signals of which the number of picture elements is less than that of the first video signal, comprising:

control means for judging whether said encoded data is said first encoded data or said number N of second encoded data;

a buffer for temporarily storing said first encoded data or said number N of second encoded data and outputting it; and decoding means for decoding said first encoded data or said number N of second encoded data output from said buffer, and wherein said control means divides said buffer into N areas when it is judged that said encoded data is said number N of second data, and controls said decoding means to decode in parallel said number N of second video signals with said buffer divided into N areas.

3. A digital signal transmitting apparatus for encoding and multiplexing a first video signal or the number N (N is a natural number) of second video signals of which the number of picture elements is less than that of the first video signal, which is supplied from the exterior, to transmit it, comprising:

control means for judging whether a video signal supplied from the exterior is said first video signal or said number N of second video signals;

encoding means for encoding said first video signal or said number N of second video signals to output it as first encoded data or the number N of second encoded data;

a buffer for temporarily storing said first encoded data or said number N of second encoded data and outputting it;

multiplexing means for multiplexing said first encoded data or said number N of second encoded data output from said buffer and outputting it as multiplexed data; and transmitting means for transmitting said multiplexed data, and wherein said control means divides said buffer into N areas when it is judged that the video signal supplied from the exterior is said number N of second video signals, and controls said encoding means to encode in parallel said number N of second video signals with said buffer divided into N areas.

4. A digital signal encoding method of encoding a first video signal or the number N (N is a natural number) of second video signals of which the number of picture elements is less than that of the first video signal, which is supplied from the exterior, comprising:

a control step of judging whether a video signal supplied from the exterior is said first video signal or said number N of second video signals; and an encoding step of encoding said first video signal or said number N of second video signals to output it as first encoded data or N second encoded data, and wherein said control step divides said buffer into N areas when it is judged that the video signal supplied from the exterior is said number N of second video signals, and controls said encoding step to encode in parallel said number N of second video signals with said buffer divided into N areas.

5. A digital signal decoding method of decoding first encoded data which is obtained by encoding a first video signal or the number N of second encoded data which are obtained by encoding the number N (N is a natural number) of second video signals of which the number of picture elements is less than that of the first video signal, comprising:

a control step of judging whether said encoded data is said first encoded data or said number N of second encoded data; and a decoding step of decoding said first encoded data or said number N of second encoded data after temporarily storing it in a buffer, and wherein said control step divides said buffer into N areas when it is judged that said encoded data is said number N of second data, and controls said decoding step to decode in parallel of said number N of second video signals with said buffer divided into N areas.

6. A digital signal transmitting method of multiplexing and transmitting a first video signal or the number N (N is a natural number) of second video signals of which the number of picture elements is less than that of the first video signal, comprising:

a control step of judging whether a video signal supplied from the exterior is said first video signal or said number N of second video signals;

an encoding step of encoding said first video signal or said number N of second video signals to output it as first encoded data or the number N of second encoded data after temporarily storing it in a buffer; and a multiplexing step of multiplexing said first encoded data or said number N of second encoded data, and wherein said control means divides said buffer into N areas when it is judged that the video signal supplied from the exterior is said number N of second video signals, and controls said encoding step to encode in parallel said number N of second video signals with said buffer divided into N areas.

7. An encoding apparatus for encoding source television signals, comprising:

encoding means for encoding said source television signals with a plurality of encoding processors;

buffering means for buffering encoded streams obtained by encoding said source television signals with said encoding means;

transmitting means for transmitting said encoded streams subjected to the buffering by said buffering means; and control means, in the case where said source television signal is a high resolution television signal, for controlling said encoding means and said buffering means so as to prevent said buffering means from overflow or underflow and to encode said high resolution television signal; and in the case where said source television signals are low resolution television signals of a plurality of channels, for controlling said encoding means and said buffering means so that said buffering means is divided into the number equal to that of said plurality of channels and said low resolution television signals of said plurality of channels are encoded by corresponding processors of said encoding means respectively so as to prevent each divided area from overflow or underflow.

8. An encoding apparatus for encoding source television signals, comprising:

encoding means for encoding said source television signals with a plurality of encoding processors;

buffering means for buffering encoded stream obtained by encoding said source television signals with said encoding means; and control means for judging whether said source television signal is a high resolution television signals or low resolution television signals, and then controlling an encoding process of said encoding means and a buffering process of said buffering means according to the judgment result.

9. A decoding apparatus for decoding source encoded streams, comprising:

buffering means for buffering said source encoded streams;

decoding means for decoding said encoded streams supplied from said buffering means with a plurality of decoding processors; and control means, in the case where said source encoded stream is data generated from a high resolution television signal, for controlling said buffering means and said decoding means so as to prevent said buffering means from overflow or underflow and to decode said source encoded stream; and in the case where said source encoded streams are data generated from low resolution television signals of a plurality of channels, for controlling said decoding means and said buffering means so that said buffering means is divided into the number equal to that of said plurality of channels and that said source encoded streams of said plurality of channels are decoded by corresponding processors of said decoding means respectively so as to prevent each divided area from overflow or underflow.

10. A decoding apparatus for decoding source encoded streams, comprising:

buffering means for buffering said source encoded streams;

decoding means for decoding said encoded streams supplied from said buffering means with a plurality of processors; and control means for judging whether said source encoded stream is an encoded stream generated by encoding a high resolution television signal or by encoding low resolution television signals, and controlling a buffering process of said buffering means and a decoding process of said decoding means according to the judgment result.

* * * * *